United States Patent
Gesuita et al.

(10) Patent No.: US 9,731,381 B2
(45) Date of Patent: Aug. 15, 2017

(54) LASER CUTTING HEAD FOR MACHINE TOOL

(71) Applicant: Salvagnini Italia S.p.A, Sarego (IT)

(72) Inventors: Enzo Gesuita, Selvazzano Dentro (IT); Riccardo Manzo, Grisignano di Zocco (IT)

(73) Assignee: Salvagnini Italia S.p.A. (IT)

( * ) Notice: Subject to any disclaimer, the term of this patent is extended or adjusted under 35 U.S.C. 154(b) by 72 days.

(21) Appl. No.: 14/087,646

(22) Filed: Nov. 22, 2013

(65) Prior Publication Data

US 2015/0144607 A1    May 28, 2015

(51) Int. Cl.
| | |
|---|---|
| *B23K 26/38* | (2014.01) |
| *B23K 26/30* | (2014.01) |
| *B23K 26/14* | (2014.01) |
| *B23K 26/04* | (2014.01) |
| *B23K 26/06* | (2014.01) |
| *B23K 26/70* | (2014.01) |

(52) U.S. Cl.
CPC .......... *B23K 26/38* (2013.01); *B23K 26/0665* (2013.01); *B23K 26/1462* (2015.10); *B23K 26/703* (2015.10)

(58) Field of Classification Search
CPC .. H01S 3/04; H01S 5/024; H05K 7/20; B23K 26/06; B23K 26/0648; B23K 26/38; B23K 26/423; B23K 26/14; B23K 26/1458
USPC ............. 165/72–75; 372/34–36; 219/121.67, 219/121.72, 121.73, 121.75, 121.84
See application file for complete search history.

(56) References Cited

U.S. PATENT DOCUMENTS

| | | | |
|---|---|---|---|
| 4,324,972 A | | 4/1982 | Furrer et al. |
| 5,084,886 A | * | 1/1992 | Martin ............................ 372/36 |
| 5,588,300 A | * | 12/1996 | Larsson .................. F25B 21/02 |
| | | | 165/185 |
| 5,968,382 A | | 10/1999 | Matsumoto et al. |
| 6,191,943 B1 | * | 2/2001 | Tracy ...................... G06F 1/203 |
| | | | 361/679.46 |

(Continued)

FOREIGN PATENT DOCUMENTS

| | | |
|---|---|---|
| EP | 1689055 A1 | 8/2006 |
| JP | H04254388 A | 9/1992 |

(Continued)

*Primary Examiner* — David Angwin
*Assistant Examiner* — Justin Dodson
(74) *Attorney, Agent, or Firm* — Laubscher, Spendlove & Laubscher, P.C.

(57) ABSTRACT

A laser cutting head powered by a laser emission apparatus including optical transmission devices and associated with a cutting machine tool, includes a collimation device to collimate a laser beam coming from the laser emission apparatus, a focusing device to focus a collimated laser beam leaving the collimation devices, and a casing to house the focusing unit. The focusing unit includes one focusing lens and support devices to house and hold the focusing lens and move it along an adjustment direction within the casing in order to vary a focal point of the laser beam leaving the focusing lens. The laser cutting head includes a cooling unit secured to the casing and heat conducting devices used to connect the support devices with the cooling unit in order to extract the heat generated by the laser beam crossing the focusing lens by thermal conduction from the support devices and the focusing lens.

13 Claims, 4 Drawing Sheets

(56) References Cited

U.S. PATENT DOCUMENTS

| | | | |
|---|---|---|---|
| 6,198,579 | B1 | 3/2001 | Rupp |
| 6,448,534 | B1 * | 9/2002 | Kobsa .................. B23K 26/032 219/121.72 |
| 2003/0059177 | A1 | 3/2003 | Suzuki et al. |
| 2008/0030823 | A1 | 2/2008 | Shida et al. |
| 2010/0116796 | A1 | 5/2010 | Jancso et al. |
| 2011/0280025 | A1 * | 11/2011 | Schwarz et al. ............. 362/373 |
| 2012/0300803 | A1 * | 11/2012 | Kangas ......................... 372/34 |
| 2013/0022066 | A1 * | 1/2013 | Toyohara et al. ............... 372/34 |
| 2013/0256558 | A1 * | 10/2013 | Dietl et al. .............. 250/440.11 |

FOREIGN PATENT DOCUMENTS

| | | |
|---|---|---|
| JP | H0645705 A | 2/1994 |
| JP | 2000056185 A | 2/2000 |
| JP | 2004025187 A | 1/2004 |
| JP | 2012091191 A | 5/2012 |
| KR | 20060116802 A | 11/2006 |
| WO | 2012157355 A1 | 11/2012 |

* cited by examiner

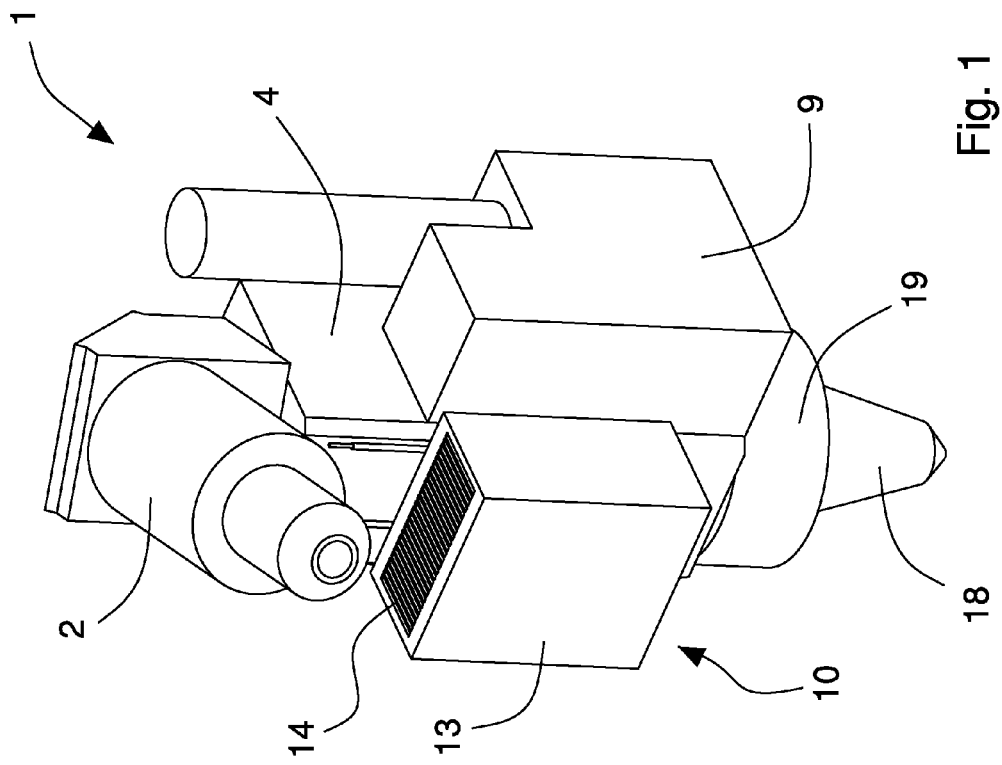
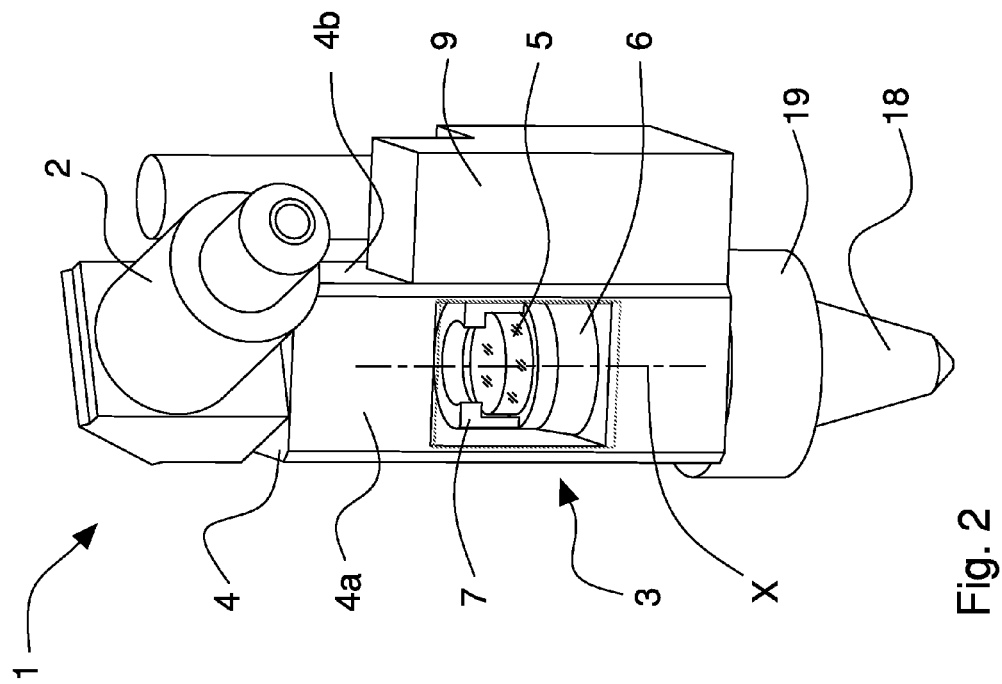
Fig. 1
Fig. 2

LASER CUTTING HEAD FOR MACHINE TOOL

BACKGROUND OF THE INVENTION

The present invention relates to laser cutting devices for cutting machine tools and in particular it relates to a laser cutting head to be used in a fiber optic laser cutting system in a cutting/punching machine tool for sheet metal.

The use of laser systems for cutting, engraving and welding parts is well known and widely used in the sector of machine tools for processing metal sheets and plates.

BRIEF DESCRIPTION OF THE PRIOR ART

Lasers are known to be devices capable of emitting a coherent, monochrome beam of light, concentrated in a rectilinear radius and having extremely high luminosity (brilliance), by means of a process of stimulated emission. The possibility of concentrating a large amount of energy in a very small point enables laser devices to cut, engrave and weld metal. The cutting of metallic material typically occurs through vaporization and, in particular, through fusion, where the laser beam melts a small point of the metal and the molten metal (dross) is removed by a blast or jet of gas.

Different types of laser sources can be used to generate a beam of light suitable for cutting metal. Typically, gas (dioxide, carbon monoxide, CO2) and solid-state (diode, doped glass, fiber) lasers are used.

In machine tools, on account of the high energy levels required to cut sheet metal, and particularly thick sheet metal, the dimensions and weight of the laser emission apparatus are such as to prevent them from being positioned on the machine. The laser beam is focused on the workpieces by a laser cutting head, or focusing head, that is connected to the emission apparatus by an optical chain (in CO2 lasers) or a transmission fiber (optical fiber, for example in YAG diode lasers). Because of its reduced dimensions and weight, the laser cutting head can, in fact, be moved with precision and speed by the machine tool in order to cut the product.

In so-called fiber laser cutting systems, where a cable of optical fiber is used to transport the laser beam to the cutting head, the cutting head is typically equipped with an optical collimator which converges the beam of light leaving the optical fiber on a focusing unit capable of focusing the collimated laser beam on the part being cut.

The focused laser beam leaves the focusing head through a cutting nozzle which concentrates the blast or jet of gas used to remove the dross generated by the fusion of the metal and limits the probability of the dross reaching the focusing unit. The focusing unit, in particular, concentrates the laser beam, positioning its focal point or focus on a given point on the surface of the part being cut, or immediately underneath this surface.

Correct positioning of the focal point is necessary to concentrate the full power of the laser beam and correctly cut the material.

The focusing unit typically comprises a focusing lens installed on a lens-holder cartridge or slide that can move along an adjustment direction parallel to the direction of the laser beam so that it can be focused. More precisely, the lens-holder cartridge is moved by the respective actuator which is controlled as a function of the distance between the cutting head and the surface of the workpiece, this distance being identified by a sensor installed on the cutting head for this purpose. The surface of the workpiece (a large sheet of metal, for example) is, in fact, generally irregular and not flat but curved.

The focusing lens and the relative lens-holder cartridge are housed inside a hermetically closed container or casing so as to prevent the entry of contaminating and extraneous elements that could dirty the lens and thus alter its optical characteristics.

Cooling systems are provided to cool the cutting head and, in particular, the focusing lens.

A small fraction of the energy of the laser beam that crosses the lenses is, in fact, absorbed and transformed into heat for a number of reasons, principally because of the non-absolute transparency of the optics (coating and substratum). The heat generated by protracted use determines a rise in the temperature of the entire head and, in particular, of the focusing lens. This increase in temperature causes a variation in the refraction index of the lens itself and thus a shift in the focus. This phenomenon, commonly referred to as "thermal focus shift", thus makes it impossible for the cutting system to focus the laser beam in the desired optimal point on the surface of the workpiece, and determines a consequent deterioration in the cutting characteristics to the point of it being impossible to make the cut at all.

The increased temperature may also damage the protective layer generally provided on the surfaces of the lenses, and thus determine a further variation in the optical characteristics of the lenses.

To solve this problem, known cooling systems introduce gas (typically nitrogen) into the focusing head at a controlled temperature so that it flows across the focusing lens, thus cooling it.

External cooling of the case containing the focusing unit is not, in fact, sufficient to guarantee adequate cooling of the focusing lens.

Cooling systems using a flow of gas do, however, have the disadvantage of requiring the use of costly gases that are devoid of contaminating elements. Contaminating or extraneous particles or elements contained in the gas may, in fact, deposit themselves on the focusing lens, determining not only a variation in the refraction index of the optics, but also an absorption of the energy of the laser beam and hence a reduction in the power available for cutting.

Moreover, such systems are somewhat complex and expensive to make, as well as requiring periodic maintenance.

SUMMARY OF THE INVENTION

One of the aims of the present invention is to improve existing laser cutting heads for cutting machine tools, and in particular cutting heads for fiber optic laser cutting systems.

Another aim is to create a laser cutting head equipped with a cooling system capable of ensuring efficient and optimal cooling of the focusing unit.

The laser cutting head described in the present invention can be fed by a laser emission apparatus using optical transmission devices and can be associated with a cutting machine tool. The laser cutting head includes collimation devices to collimate a laser beam generated by the emission apparatus, focusing devices to focus the collimated laser beam leaving the collimation devices and a casing to house and contain the focusing unit. The housing is equipped with a focusing lens together with support elements to house the focussing lens and move it along an adjustment direction in order to vary the focal point of the laser beam. The laser cutting head is equipped with a cooling unit secured to the casing and thermal conductive devices for connecting the support elements to the cooling unit in order to extract the heat generated by the laser beam when crossing the focusing lens from the support elements and focusing lens by a process of thermal conduction.

The thermal conductive devices include a flexible element made of material with high thermal conductivity and the cooling unit includes a Peltier cell and a heat dissipation element. The thermal conductive devices are connected to a cold side of the Peltier cell, whereas the heat dissipation element is connected to a hot side of the Peltier cell.

During the operation of the laser cutting head, the heat generated in the focusing lens by the passage of the laser beam is transferred and surrendered by the support element and thermal conductive devices to the Peltier cell which, suitably powered and commanded by direct current, surrenders this heat to the heat dissipation element. The removal of heat by the Peltier cell, working as a heat pump, thus allows the temperature of the focusing lens to be controlled and, in particular, prevents it from overheating, which would result in a variation in its refraction index and thus an uncontrolled focal shift. The thermal efficiency of the system for cooling the cutting head described in the present invention (cooling unit and thermal conductive devices) is comparable to that of the known gas cooling systems which remove heat from the lens by convection.

With the cooling system, the laser cutting head of the present invention prevents the phenomenon of "thermal focus shift" by the focusing lens, allowing the laser beam to be focused on the desired optimal point with respect to the surface of the workpiece, ensuring efficient and accurate cutting even during prolonged and intensive operation. Temperature control and regulation also prevents damage to the protective surface of the focusing lens.

BRIEF DESCRIPTION OF THE FIGURES

The present invention can be better understood by referring to the accompanying drawings which illustrate a typical, but non-limiting, form of actuation, in which:

FIG. 1 is a perspective view of the laser cutting head in the present invention;

FIG. 2 is a view of the laser cutting head in FIG. 1, without cooling units, for better illustration of the laser beam focusing devices;

DETAILED DESCRIPTION

Figure 3:
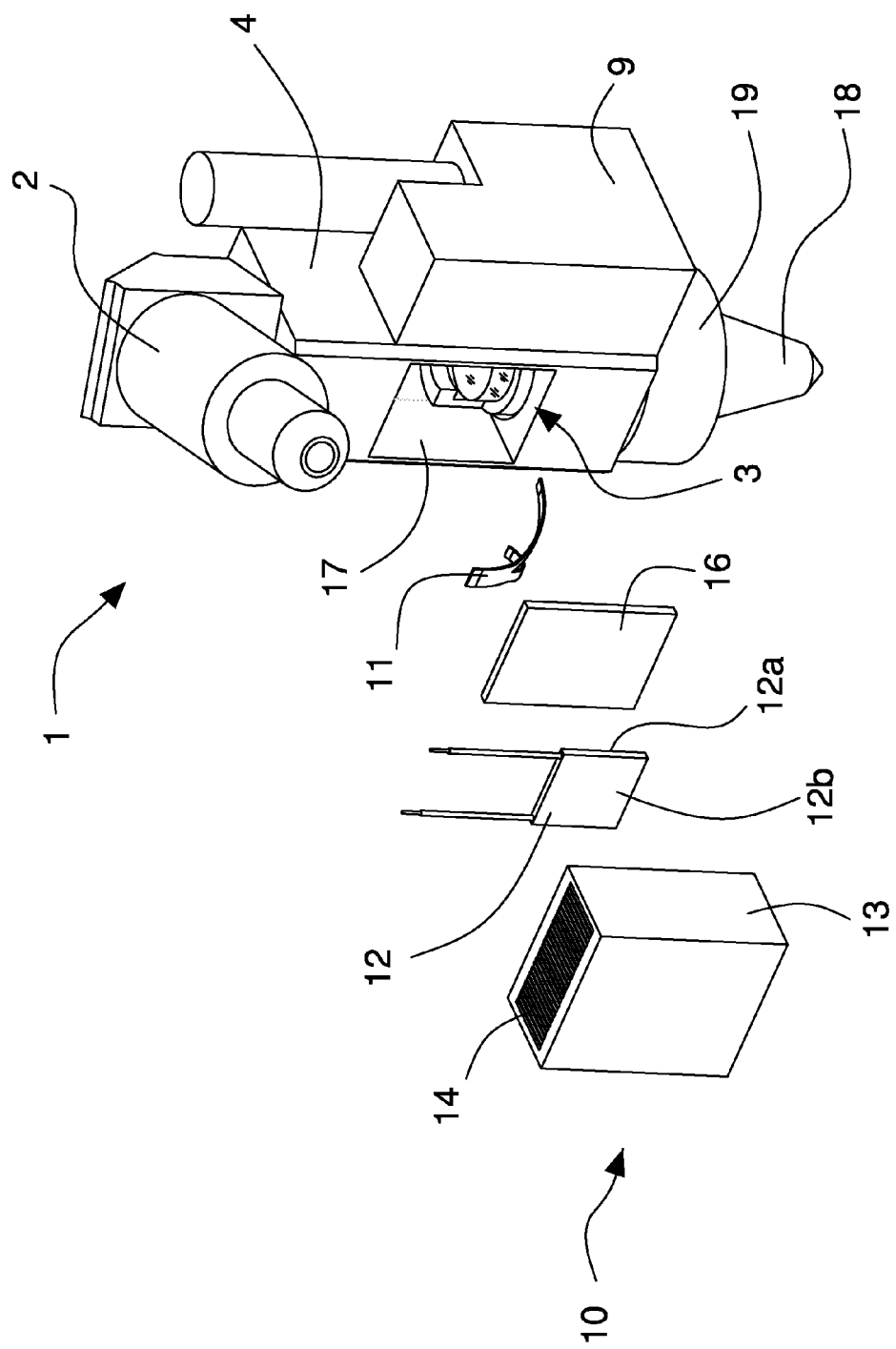
FIG. 3 is an exploded view of the laser cutting head in FIG. 1.
Figure 5:
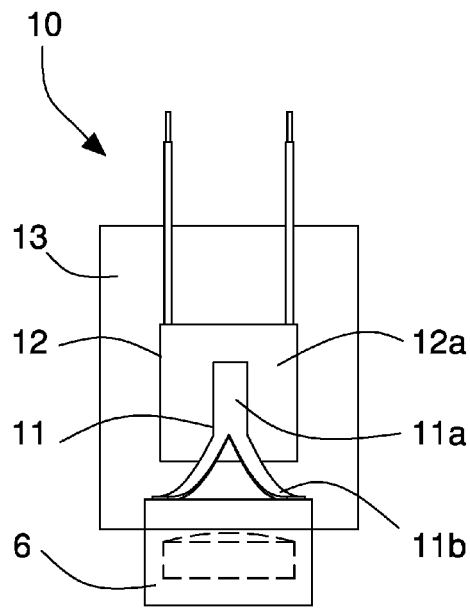
FIG. 5 is a front view of the cooling unit in FIG. 4.
Figure 6:
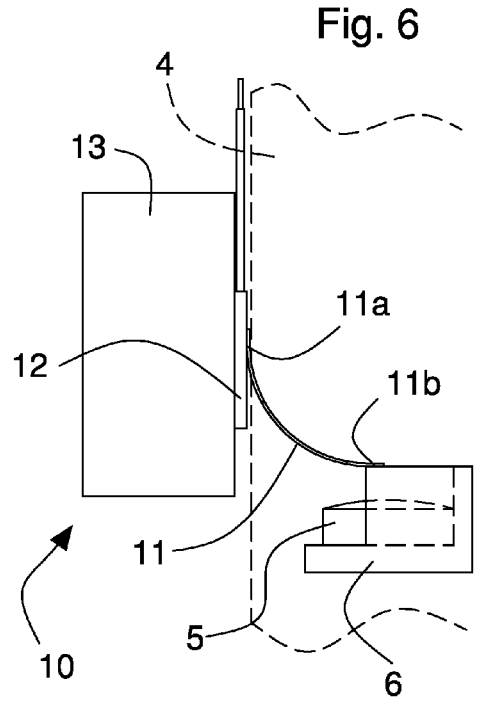
FIG. 6 is a side view of the cooling unit in FIG. 4.
Figure 7:
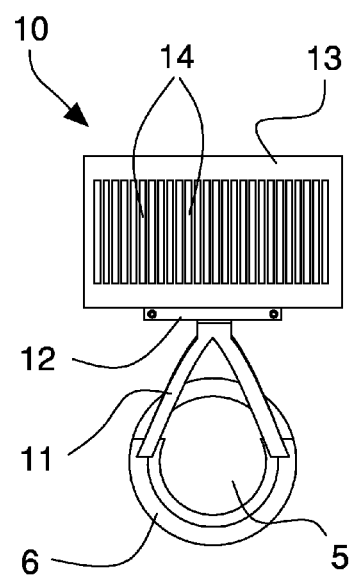
FIG. 7 is a top plan view of the cooling unit in FIG. 4.
Figure 4:
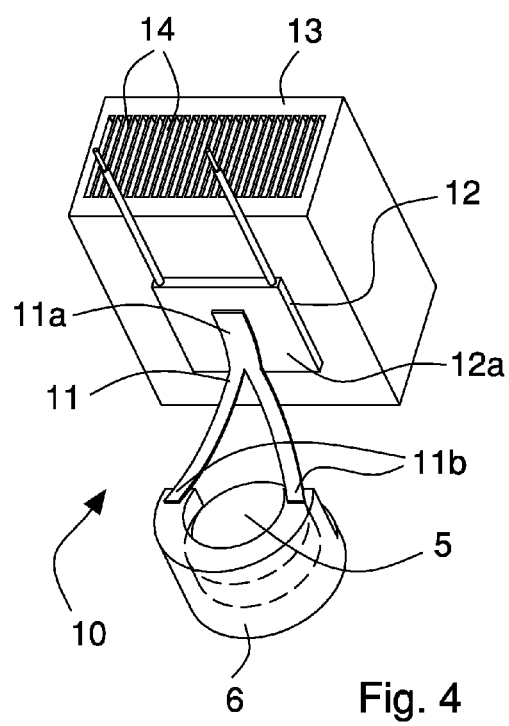
FIG. 4 is a perspective view of the cooling unit associated with the focusing devices of the laser cutting head in FIG. 1.
Figure 9:
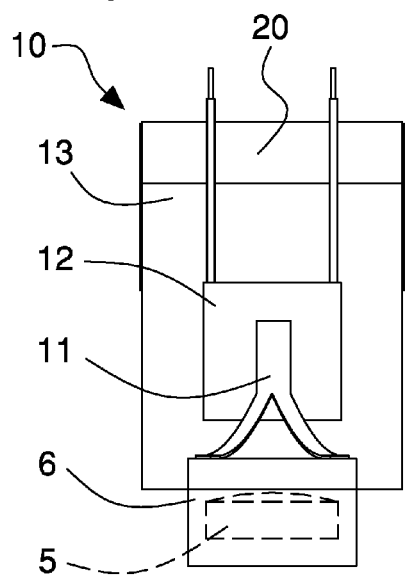
FIG. 9 is a front view of the cooling unit in FIG. 8.
Figure 10:
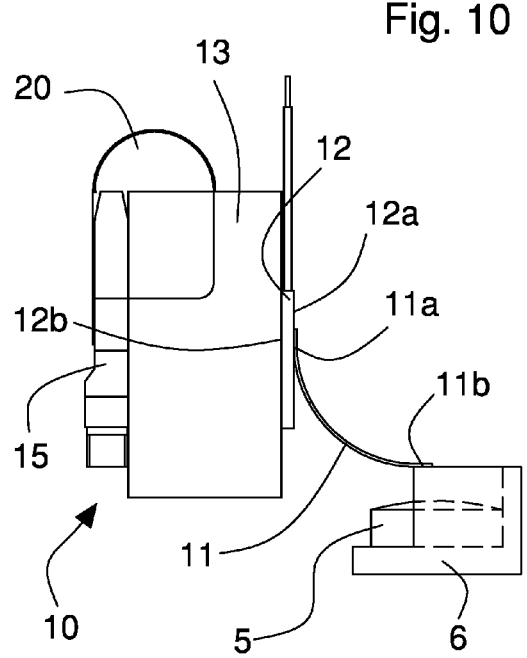
FIG. 10 is a side view of the cooling unit in FIG. 8.
Figure 11:
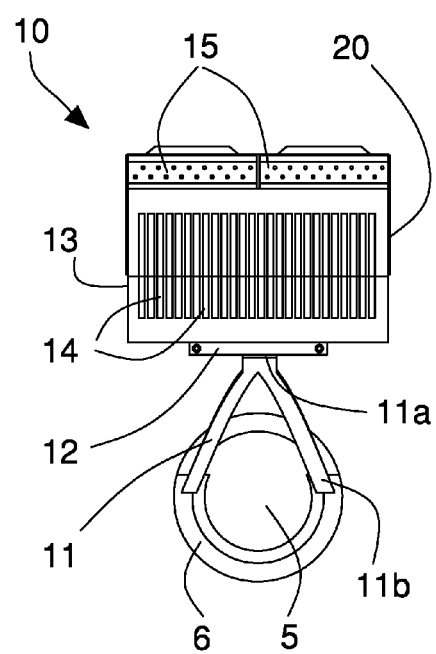
FIG. 11 is a top plan view of the cooling unit in FIG. 8.
Figure 8:
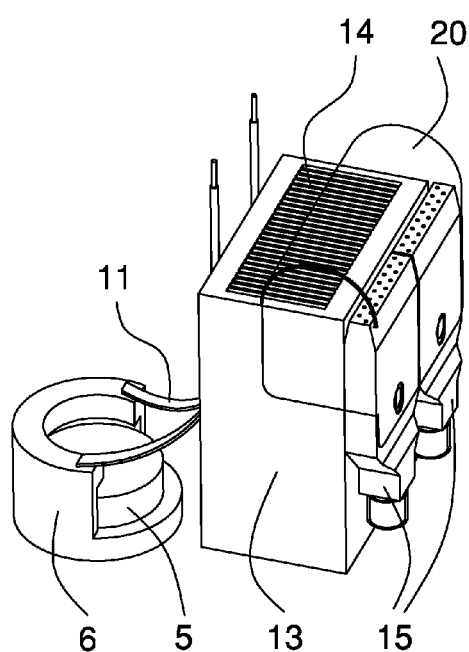
FIG. 8 is a perspective view of a variant of the cooling unit for the cutting head in the present invention associated with the focusing devices.

FIGS. 1 to 7 illustrate a laser cutting head 1 in accordance with the present invention, for feeding by a laser emission apparatus, of a known type not illustrated in the Figures, by means of optical transmission devices and associable with a cutting machine tool. In particular, the emission apparatus is of the solid-state laser stimulated emission type, and the optical transmission devices include an optical fiber cable capable of transporting the laser beam generated by the emission apparatus to the laser cutting head 1.

The laser cutting head 1 includes a collimation device 2 for collimating the laser beam generated by the laser emission apparatus, focusing devices 3 for focusing the collimated laser beam leaving the collimation device 2 and a casing 4 for containing and housing the focusing unit 3.

The cutting head 1 also includes a cutting nozzle 18 that is secured to the casing 4 by an optical centering ring-nut 19 and through which the focused laser beam passes. The cutting nozzle 18 concentrates a blast or jet of gas for removing the dross or molten material generated by the fusion of the workpiece and at the same time limits the probability of this dross reaching the inside of the casing 4 and the focusing unit 3.

The collimation device 2 is of known type and includes a set of lenses and a mirror capable of converging and collimating the beam from the optical fiber in a rectilinear laser beam directed towards the focusing devices 3.

The focusing devices 3 include at least one focusing lens 5 plus support elements 6 that are arranged to house and support the focusing lens 5 and that can be moved along an adjustment direction X inside the casing 4 to allow variation of the focal point or focus of the laser beam leaving the focusing lens 5. The adjustment direction X is parallel to the laser beam leaving the collimation device 2.

The support elements include a support element 6, which acts substantially as a carriage or cartridge for the focusing lens 5 and can be slid inside a cavity in the casing 4 along the adjustment direction X by drive devices 9. These drive devices include, for example, a linear electric actuator or a recirculating ball screw activated by a rotary electric motor and connected to the relative lead screw secured to the support element 6. The drive devices 9 are connected to the support element 6 through an opening in a side wall 4b of the casing 4.

The support element 6 includes a seat 7 into which the focusing lens 5 is inserted and locked in place.

The laser cutting head 1 also includes a cooling unit 10, which is secured to the casing 4, as well as thermal conductive devices 11 for connecting the support elements 6 to the cooling unit 10 in order to extract the heat generated by the laser beam when crossing the aforementioned focusing lens 5 from the support elements 6 and focusing lens 5 by a process of thermal conduction. The support elements 6 are, in fact, made of material with high thermal conductivity, such as aluminium alloy or brass, in order to allow the heat to be transferred from the focusing lens 5.

The thermal conductive devices 11 include at least one flexible thermal conductive element made of material with high thermal conductivity, such as braided copper tape and/or graphite-coated tape.

In the embodiment illustrated in the Figures, the flexible thermal conductive element 11 includes a main portion 11a, which is destined to be secured to the cooling unit 10 and from which two elongated portions 11b extend; these are destined to be secured to opposite sides of the support element 6.

In an embodiment that is not illustrated, the flexible thermal conductive element 11 may include a single elongated portion 11b in addition to the main portion 11a.

It should be noted that the flexibility of the thermal conductive element 11 in no way hinders the movement of the support element 6 along the adjustment direction X in the operation of the laser cutting head 1.

The cooling unit 10 includes a Peltier cell 12 and a heat dissipation element 13. The flexible thermal conductive device 11 is connected to the cold side 12a of the Peltier cell 12, whereas the heat dissipation element 13 is connected to the hot side 12b of the Peltier cell 12.

The Peltier cell is a thermoelectric device that acts as a solid-state heat pump and typically has the appearance of a thin plate: one of the two faces of the plate absorbs heat while the other emits it. The direction in which the heat is transferred depends on the direction of the direct current applied at the ends of this plate. More precisely, a Peltier cell is composed of a number of Peltier junctions arranged in series to form a thin plate. The junction is formed of two doped semi-conductors, one N-type and one P-type, connected together by two opposing sheets of copper that form the outside faces of the plate. Applying a direct electric current of the opposite voltage to the semi-conductor materials cools one sheet or face of the plate and at the same time heats the sheet or face of the opposite plate, thus moving thermal energy between the two sides of the plate. Inverting the voltage of the electric current supplied to the semi-conductor materials inverts the movement of thermal energy.

The Peltier cell 12 used in the cooling unit 10 is of a known type.

The wall or cold part 12a of the Peltier cell 12 is secured to a front wall 4a of the casing 4.

The laser head 1 includes a cover 16 made of material with high thermal conductivity, such as aluminium alloy, to close an opening 17 of the casing 4 giving access to the cavity in which the support element 6 moves.

In the solution shown in FIG. 3, the cold side 12a of the Peltier cell 12 is secured to an outer wall of the cover 16 and the flexible heat conducting element 11 is secured to the inner wall of the cover 16.

Alternatively, the flexible heat conducting element 11 can be directly secured to the cold side 12a of the Peltier cell by a corresponding opening provided in the cover 16 (FIGS. 4-7).

In a version of the cutting head that is not shown, it has been envisaged that the cooling unit 10 includes a number of Peltier cells 12 arranged in series and/or parallel.

The heat dissipation element 13 is a body made of a material with high thermal conductivity, such as aluminium alloy, equipped with a number of cooling ducts 14 that allow the passage of air, in particular by convection, to cool the body itself. In the embodiment shown, the heat dissipation element has a parallelepiped shape and features a number of cooling ducts 14 that run side by side along a longitudinal direction parallel to the adjustment direction X.

The hot side 12b of the Peltier cell 12 is secured to a rear wall of the heat dissipation element 13.

Thermally conductive adhesives are used to secure the heat conducting devices 11 to the support element 6 and to the cover 16 and/or to the cold side 12a of the Peltier cell and to secure the opposite sides 12a, 12b of the cell to the cover 16 and to the heat dissipation element 13.

FIGS. 8 to 11 show a version of the cooling unit 10 which includes intake devices 15 used to introduce a cooling fluid in the cooling ducts 14 to increase the heat exchange (forced convection) and cool the hot side 12b of the Peltier cell more quickly and effectively. The intake devices 15, for instance, include a pair of nozzles fed with compressed air and capable of introducing the air in expansion in the cooling ducts 14. A diverter element 20 allows the flow of compressed air leaving the nozzles 15 to be directed in the cooling ducts 14 so that the cooling fluid or air leaves the heat exchange element 13 directed toward the part to cut.

During the operation of the laser cutting head 1 of the invention, the heat generated in the focusing lens 5 by the passage of the laser beam leaving the collimation devices 3 (heat generated by a non-absolute transparency of the lens) is transferred and surrendered to the support element 6, to the heat conducting devices 11 and to the cold side 12a of the Peltier cell 12. In this way, at full performance, the heat is transferred from the focusing lens 5 to the Peltier cell 12, which surrenders the heat to the heat dissipation element 13 (secured to the hot side 12b of the said Peltier cell 12).

It should be noted that during the operation of the laser cutting head 1, the focusing lens 5 surrenders the heat to the support element 6, which transfers it to the heat conducting element 11. The heat extraction produced by the Peltier cell 12, which works as a heat pump, allows the temperature of the focusing lens 5 to be checked and in particular to prevent the overheating of the lens with consequent variation of the refractive index of the lens itself and hence a shift of the focus.

By adjusting the intensity and voltage of the direct electrical current, which powers the Peltier cell 12, it is possible to check the temperature of the focusing lens 5 in an accurate and reliable manner during the operation.

With the cooling system, the laser cutting head 1 of the invention avoids thermal focus shift of the focusing lens 5 during long and intensive operation and therefore focuses the laser beam in the optimum point with respect to the surface of the work piece with accuracy and cutting efficiency.

The control and regulation of the temperature also avoids damage to the surface protective layer of the focusing lens 5.

The invention claimed is:

1. A laser cutting head powered by a laser emission device for a cutting machine tool, comprising
    (a) a casing including a cavity having an opening;
    (b) a cover formed of a thermally conductive material removably connected with said casing to close said opening;
    (c) a collimation device connected directly with said casing for collimating a laser beam emitted from the laser emission device;
    (d) a focusing device arranged within said cavity for focusing a collimated laser beam from said collimation device, said focusing device including a support device and at least one lens retained by said support device, said support device comprising a support element formed of a thermally conductive material and being adapted to move within said cavity along an adjustment direction in order to vary a focal point of said collimated laser beam;
    (e) a cutting nozzle that is secured to said casing and through which the focused laser beam passes, said cutting nozzle concentrating a gas jet for removing molten material generated by the fusion of a workpiece that is cut by the laser beam;
    (f) an external cooling unit connected with said cover and comprising at least one Peltier cell; and
    (g) at least one heat conducting device connecting said support device with said cooling unit via said cover, wherein said cover is disposed between said heat conducting device and said cooling unit, said heat conducting device being adapted to extract heat generated by said collimated laser beam crossing the focusing lens by thermal conduction in order to cool said focussing lens and avoid thermal focus shifting thereof, said heat conducting device being formed of a non-rigid material to afford movement of said support device along the adjustment direction during operation of the laser cutting head.

2. A laser cutting head as defined in claim 1, wherein said heat conducting device includes at least one heat conducting element formed of a thermally conductive material.

3. A laser cutting head as defined in claim 2, wherein said heat conducting element comprises one of a braided copper tape and a graphite coated tape.

4. A laser cutting head as defined in claim 2, wherein said heat conducting element comprises a main portion connected with said cooling unit and at least two extended portions connected with opposite sides of said support element.

5. A laser cutting head as defined in claim 1, wherein said cooling unit further includes a heat dissipation element, said flexible heat conducting device being connected with a cold side of said Peltier cell and said heat dissipation element being connected with a hot side of said Peltier cell.

6. A laser cutting head as defined in claim 5, wherein said cold side of said Peltier cell is connected with a wall of said casing.

7. A laser cutting head as defined in claim 5, wherein said cold side of said Peltier cell is connected with an outer surface of said cover.

8. A laser cutting head as defined in claim 7, wherein said heat conducting device is connected with an inner surface of said cover.

9. A laser cutting head as defined in claim 1, wherein said cover contains an opening and said heat conducting device is connected directly with a cold side of said Peltier cell via said cover opening.

10. A laser cutting device as defined in claim 1, wherein said cooling unit includes a plurality of Peltier cells connected in one of series and parallel.

11. A laser cutting device as defined in claim 1, wherein said heat conducting devices are connected with said support devices and with said Peltier cell via a thermally conductive adhesive.

12. A laser cutting device as defined in claim 5, wherein said heat dissipation element includes a plurality of cooling ducts for passage of air via convection.

13. A laser cutting device as defined in claim 12, wherein said heat dissipation element contains a plurality of intake devices for introducing a cooling fluid into said cooling ducts.

* * * * *